(12) United States Patent
Shen et al.

(10) Patent No.: US 11,977,965 B1
(45) Date of Patent: May 7, 2024

(54) CLIENT INTEREST PROFILES AND EMBEDDINGS FOR A RESEARCH ORGANIZATION

(71) Applicant: Morgan Stanley Services Group Inc., New York, NY (US)

(72) Inventors: Jing Shen, Great Neck, NY (US); Yu Zhang, Carle Place, NY (US); Monika Nica, Ridgefield, CT (US); Neil Sanyal, Canal Winchester, OH (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/199,642

(22) Filed: May 19, 2023

(51) Int. Cl.
*G06N 20/00* (2019.01)

(52) U.S. Cl.
CPC .................... *G06N 20/00* (2019.01)

(58) Field of Classification Search
CPC ........... G06N 20/00; G06N 3/08; G06N 20/20
See application file for complete search history.

(56) References Cited

U.S. PATENT DOCUMENTS

| | | | |
|---|---|---|---|
| 7,660,815 B1 | 2/2010 | Scofield et al. | |
| 7,689,490 B2 * | 3/2010 | Hurewitz | G06Q 10/06 705/36 R |
| 7,734,517 B2 | 6/2010 | Hurewitz | |
| 7,769,654 B1 | 8/2010 | Hurewitz | |
| 7,774,335 B1 | 8/2010 | Scofield et al. | |
| 7,797,421 B1 | 9/2010 | Scofield et al. | |
| 8,386,509 B1 | 2/2013 | Schofield et al. | |
| 8,566,146 B1 | 10/2013 | Hurewitz et al. | |
| 8,694,413 B1 * | 4/2014 | Hurewitz | G06Q 40/00 705/37 |
| 8,825,539 B2 | 9/2014 | Hurewitz et al. | |
| 11,004,135 B1 * | 5/2021 | Sandler | G06Q 30/0631 |
| 11,409,821 B1 | 8/2022 | Pal et al. | |
| 2006/0184424 A1 * | 8/2006 | Connolly | G06Q 30/0277 705/14.73 |
| 2010/0290603 A1 | 11/2010 | Gemayel et al. | |
| 2012/0158685 A1 | 6/2012 | White et al. | |

(Continued)

FOREIGN PATENT DOCUMENTS

WO 2007/038587 A2 4/2007

*Primary Examiner* — Abdullah Al Kawsar
*Assistant Examiner* — Tewodros E Mengistu
(74) *Attorney, Agent, or Firm* — K&L Gates LLP

(57) ABSTRACT

Computer systems and methods for a research organization compute interests of clients in research work product, and, using deep learning and embedding techniques, digitalize client interest profiles and research content entities. A first machine learning model is trained to compute client-interest scores from, at least in part, client engagement data. The computer system is also configured to compute embeddings for each of the clients and embeddings for each of certain research topics. The embeddings are computed using a second machine learning model, such as deep artificial neural network, such that embeddings for clients with similar interests are close, distance-wise, in a client embedding space, and such that embeddings for certain research topics with similar client engagements are close, distance-wise, in a research topic embedding space. The second machine learning model can be trained with both positive and negative training samples generated from the client-interest scores.

21 Claims, 8 Drawing Sheets

(56) References Cited

U.S. PATENT DOCUMENTS

| | | |
|---|---|---|
| 2012/0311030 A1 | 12/2012 | Lin et al. |
| 2013/0132145 A1 | 5/2013 | Hurewitz et al. |
| 2018/0121549 A1 | 5/2018 | Ramesh et al. |
| 2018/0349793 A1* | 12/2018 | Triolo ................ G06N 5/048 |
| 2019/0026760 A1 | 1/2019 | Hwang et al. |
| 2020/0082431 A1* | 3/2020 | Rajasekharan .... G06Q 30/0242 |
| 2020/0288205 A1 | 9/2020 | Ding et al. |
| 2021/0049442 A1 | 2/2021 | Menon et al. |
| 2021/0390609 A1 | 12/2021 | Trinh |
| 2022/0253688 A1* | 8/2022 | Wu .................... G06Q 30/0631 |
| 2022/0318649 A1 | 10/2022 | Chen |
| 2023/0153579 A1* | 5/2023 | Sun ..................... G06N 3/0464 |
| | | 706/25 |

\* cited by examiner

CLIENT INTEREST PROFILES AND EMBEDDINGS FOR A RESEARCH ORGANIZATION

BACKGROUND

In the securities research industry, so called "sell-side firms" provide, among other things, research regarding securities, industries and fixed income asset class, for certain geographical areas, to, among others, so-called "buy-side firms," which are typically institutional investors such as mutual funds, hedge funds, pension funds, etc. Particularly for equity research, sell-side firms typically employ a number of analyst teams that analyze and publish research reports and other work product about equity securities for publicly-traded companies in different industry sectors and/or geographic regions. For example, a sell-side firm may have a North America pharmaceuticals research team that analyzes North American publicly-traded pharmaceutical companies, a North America oil services research team that analyzes North American publicly-traded oil services companies, a North America semiconductors research team that analyzes publicly-traded companies that make and sell semiconductor products, and so on. The sell-side firm might also have corresponding European and/or Asian research analyst teams.

The analyst teams typically include a primary analyst and several research associates, though some teams may have other positions as well. These research teams generate numerous different types of research touch points for consumers of their research (e.g., the buy-side firms). The research touch points may include research reports (e.g., published electronic or hard copy reports), one-to-one telephone calls or meetings with contacts at the buy-side firms, tailored or blast emails and voicemails to such contacts, and/or other events such as seminars, conferences, corporate road shows, and meetings with corporate management.

A sell-side firm also typically employs salespeople who facilitate the distribution of the work product of the various research teams to appropriate contacts at the buy-side firms. The contacts typically are associated with one or more investment funds or accounts of the buy-side firm. A sell-side salesperson typically has contacts at many different buy-side firms, and those contacts may be interested in research work product from many different analyst teams at the sell-side firm.

SUMMARY

In one general aspect, the present invention is directed to computer systems and computer-implemented methods for a research organization that compute interests of client of the research organization in research work product produced by the research organization, and that, using deep learning and embedding techniques, digitalize client interest profiles and research content entities. The research organization can be a financial securities research organization, such as a sell-side firm, where the research entities, or topics, of the firm include stock tickers, industries, and investment asset classes. The clients of the research organization can be associated with an investment fund (or funds) and the clients consume the research work product of the research organization in order to make investment decisions for their associated fund(s). The research organization can provide more personalized recommendations for its clients based on the client interest profiles and the embeddings.

The computer system can comprise a database system that stores client engagement data for clients of the research organization, where the client engagement data is indicative of engagement of clients with the research organization. The computer system can also employ a first machine learning model, such as a random forest, that is trained to compute the client-interest scores from, at least in part, the client engagement data. A client-interest score can be computed for each client in a collection of clients, for each research topic in a collection of research topics.

The computer system can also be configured to compute embeddings for each of the clients and embeddings for each of the certain research topics, where the embeddings are computed using a second machine learning model, such as deep artificial neural network, such that embeddings for clients with similar interests are close, distance-wise, in a client embedding space, and such that embeddings for certain research topics with similar client engagements are close, distance-wise, in a research topic embedding space. The second machine learning model can be trained to compute the embeddings with both positive and negative training samples generated from the client-interest scores.

In various implementations, the computer system is also configured to compute, for each of the clients, for each of the certain research topics, from the client engagement data, a client engagement score, wherein the first machine learning model (e.g., the random forest) is trained based on the client engagement scores. The computer system can compute the client engagement scores by, for each client, for each research topic: (i) computing a plurality of normalized interest signal scores based on the client engagement data; (ii) ranking the plurality of normalized interest signal scores in descending order, to thereby generated a ranked order of normalized interest signal scores for the client for the certain research topic; and (iii) computing the client engagement score for the client for the certain research topic based on a weighted average of the plurality of normalized interest signal scores for the client for the certain research topic, such that a higher ranked normalized interest signal score is weighted greater than a lower ranked normalized interest signal score. For example, an exponential decay weighting function can be used to weight the normalized interest signal scores.

The interest signal scores can reflect online and offline client behavior. The interest signals can comprise, for example: a read concentration interest signal score, for a client for a research topic, indicative of a concentration of research work product items produced by the research organization accessed by the client pertaining to the topic from a web portal of the research organization relative to all work product items produced by the research organization accessed by the client from the web portal; a readership interest signal score, for a client for a research topic, indicative of research work product items produced by the research organization accessed by the client pertaining to the topic from the web portal of the research organization; an interaction interest signal score, for a client for a research topic, indicative of communication interactions by the client with one or more analysts of the research organization pertaining to the topic; a web portal time interest signal score, for a client for a research topic, indicative of time spent, by the client, on web pages of the web portal of the research organization pertaining to the topic; a subscription interest signal score, for a client for a research topic, indicative of subscriptions of the client for research work product of the research organization; a corporate meetings interest signal score, for a client for a research topic, indicative of attendance by the client at a corporate meeting pertaining to the topic; a model downloads interest signal score, for a client for a research topic, indicative of a number of models downloaded by the client from the web portal of the research organization pertaining to the topic; and/or an email opens interest signal score, for a client for a research topic, indicative of a number of emails, pertaining to the topic, from the research organization to the client, opened by the client.

The computer system may further be configured to determine a distribution list of clients for a research work product item from the research organization, where the distribution list is determined based on the client-interest scores and the embeddings. The computer system can further comprise one or more email servers for emailing, to the clients on the distribution list, a link on a web portal of the research organization to the research work product item.

These and other benefits that can be realized through various embodiments of the present invention will be apparent from the description that follows.

FIGURES

Various embodiments of the present invention are described herein by way of example in connection with the following figures.

DESCRIPTION

Figure 1:
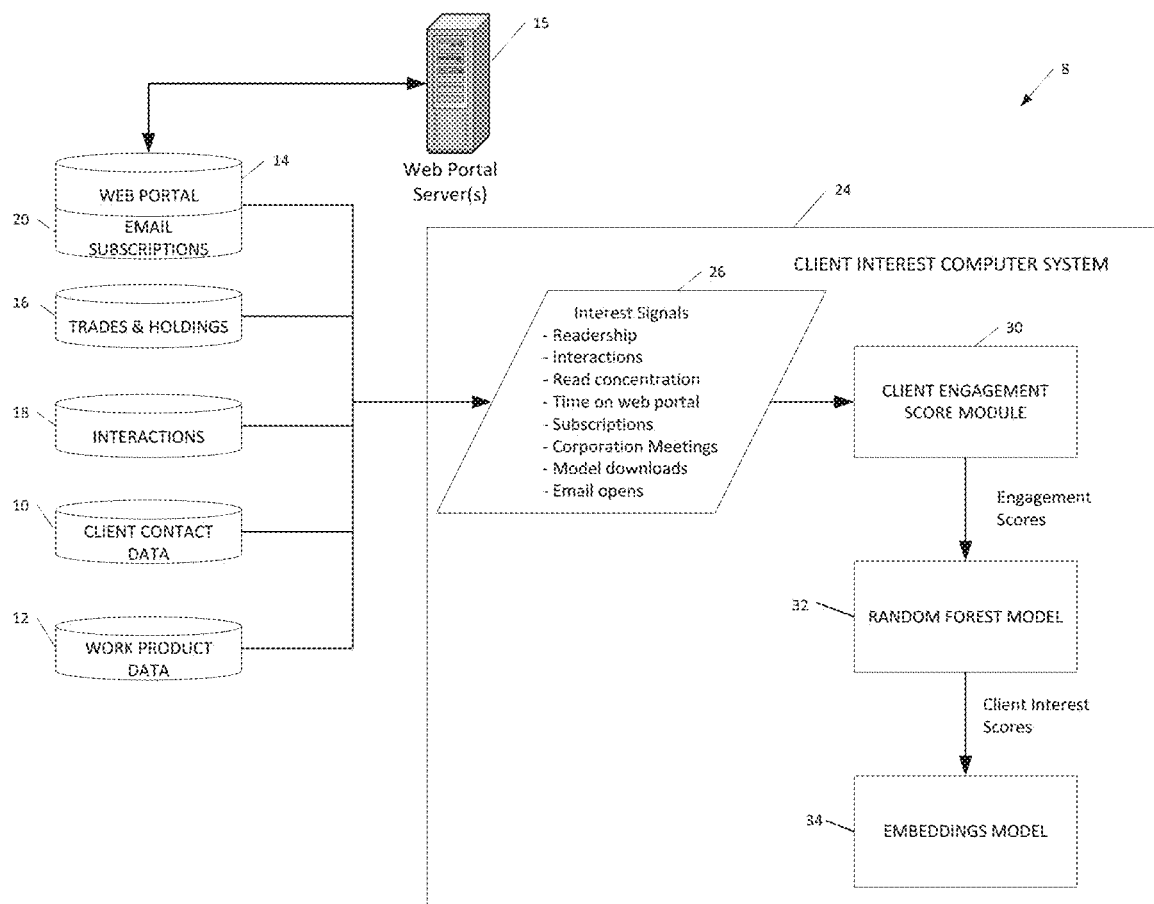
FIG. 1 is diagram of a computer system for a research organization to compute client interest scores and embeddings according to various embodiments of the present invention.

Various embodiments of the present invention are directed to computer-implemented systems and methods for computing client interest profiles of clients of a research organization, such as sell-side research firm, in research topics covered by the research firm. The present invention can also compute embeddings for clients and research work product, so that research entities (e.g., research topics) with similar client engagements are close (have a relatively small Euclidean distance) in a multi-dimensional space. The client interest profiles and embeddings can be used to distribute new research work product from the organization to client that are likely to have a greater interest in the new research work product. The client interest profiles and embeddings can also be used to promote research teams of the research organization to certain clients, e.g., clients that are likely to have a high interest in the work product of the research team, etc. The "client" in this context can be a person at a buy-side firm, or a group of people at a buy-side firm. The research topics can include individual, publicly-traded stocks or securities (referred to as "tickers" herein), industry sectors (e.g., GICS sectors), and/or fixed income asset classes. Fixed income asset classes can include, for example, government bonds, municipal bonds, corporate bonds, and asset-backed securities. The research topics can also have a geographic scope, e.g., the pharmaceutical industry in North America, etc.

In one aspect, the computer system computes, for each applicable client of the sell-side research firm, a client-engagement score for each applicable ticker, industry sector, and fixed income asset class based on "interest signals" from the client. As explained herein, the client-engagement score for each client, for each topic, can be computed using a weighed average of the client's normalized score for each of the interest signals for the topic, where the interests signals are weighted according to an exponential decay weighted function, such that each client's particular dominant interest signals are weighted greater than the client's less dominant interest signals. The client-engagement scores can then be used to train a machine learning model, such as random forest, to computed predicted client interest scores for each client for each research entity/topic. The client interest scores in turn can be used to train, iteratively, an artificial neural network (ANN), to digitalize the client interests and the research entities/topics. That is, the ANN can be trained to generate embedding vectors for the clients and research topics, so that clients with similar interests are close (have a small Euclidian distance) in the embedding space and similarly research entities/topics with similar client engagements are close (have a small Euclidian distance) in an embedding space. Both the predicted client interest scores and the embeddings (once trained) can be used to make recommendations to clients of the research organization. For example, when a new piece of research work product is ready for publishing, the sell-side firm can recommend the new piece of work product, or distribute it, to clients that are likely to have a relatively high interest in the new work product based on the topic(s) covered by the work product and the clients' engagements with the research entity(ies)/topic(s). Similarly, clients can be introduced to research teams at the research firm based on the topics covered by the research team and the clients' engagements with those topics. Many other uses of client interest scores, engagement scores and embeddings could be employed by the research organization.

FIG. 1 is a block diagram of a system 8 according to various embodiments of the present invention. The system 8 requires data about the clients, their online behavior and off-line engagements, as well as data about the research work product prepared by the research organization (e.g., sell-side firm). The system can include a database 10 that stores contact information about the clients, e.g., names, contact info, funds that they work for, etc. There can also be a database 12 that stores data about work product produced by the research organization. The work product could be, for example, articles about ticker or industries, etc., or it could be models, such as financial models for tickers. Each piece of work product is associated with one or more research entities (or topic(s)) covered by the research organization, such as tickers, industries, fixed income asset classes, etc. The database 14 can also store data indicating which research team produced the research work product (e.g., the author(s) of the work product) and when the research work product was created or published on a research web portal for the research organization, through which the clients, with appropriate log-in credentials, can access, browse and download work product of the research organization. The web portal may be hosted by one or a number of internetworked web portal server(s) 15 of the research organization.

The illustrated computer system 8 includes other databases that store other data that may be used to determine the clients' interest signals in the various topics covered by the research organization. For example, a web portal database 14 can track and store how long each client was on the web portal by time increments (e.g., minutes) and what work product available on the web portal the clients downloaded or viewed. By knowing what work product clients downloaded from the web portal, the interests of the clients in the topic(s) covered by the work product can be inferred. For example, if a client downloads articles related to two tickers, it can be inferred that the client has an interest in those two tickers. Also, different topics could have different pages on the web portal. By tracking how much time a client spent on a certain page, the interest of the client in the topic related to that page can be inferred. For example, if the web portal has one web page for research about pharmaceutical companies and another web page for research about oil services companies, and a client spends significantly more time on the pharmaceuticals research page, it can be inferred that the client has more interest in the pharmaceuticals industry than in the oil services industry.

There can also be a trades and holdings database 16. As mentioned about, the clients can be representatives of buy-side firms, particularly investment funds. The trades and holdings database 16 can store data about trades and holdings of the buy-side firms. The data may describe present and/or historic execution revenue received from the sell-side firm from the funds. In various embodiments, the data may include historic data for the funds extending back multiple time periods (e.g., calendar quarters). If a fund holds a significant quantity of stock in a ticker and/or if a fund makes a significant amount of trades involving the ticker, it can be inferred that clients associated with the fund have an interest in the ticker.

There can also be an interactions database 18, which stores data about interactions of the clients with the research teams. The interactions may be, for example, emails, phone calls, video calls and meetings (in-person or virtual) involving the various clients and members of the various research teams. The interactions database 18 may also store data about corporate access meetings attended (virtually or in person) by the client. The interaction-type data may include the date, time, duration, participants and/or topic(s) of the interaction. In the case of a corporate access meeting, the topic would likely be the company that is the focus of the access meeting and, at an industry level, the industry for the company. Some of the data may be automatically captured by systems of the sell-side firm, such as its email, phone and video systems, and some of the data may be updated, enhanced or entered by employees/agents of the research department. The data about interactions by the clients with the various analyst teams may include: an ID for each interaction; an interaction date; and interaction time; a duration of the interaction (which may be pro rated; e.g., a 30 minute meeting with 3 contacts may be pro rated to 10 minutes for each contact); and an interaction type (e.g., email, phone call, conference call, corporate meeting, etc.).

Also, there can be an email subscription database 20. This database can store data indicative of subscriptions of the clients to work product of the research organization. For example, via the web portal, a client could sign up for a subscription for work product about particular topics/entities, such as tickers, industries, fixed income asset classes, etc. Every time the research organization produces new work product for one of the topics, clients that have subscribed for that topic can receive an email from the research organization alerting the clients that there is new work product pertaining to the topic available on the web portal. The email can also have a link to the work product on the web portal. Data indicative of these subscriptions for the various clients can be stored in this database 20. The database 20 can also store whether the clients opened the emails sent pursuant to their subscriptions using email tracking software. For example, the email tracking software can insert a tracking image pixel into emails sent to the clients such that, when the recipient opens the email, the recipient's email provider makes a request to the web portal (or other server of the research organization) to retrieve the pixel. The web portal database 14, as described above, can store data indicative of whether the client downloaded the work product.

More details regarding such databases may be found in the following patent documents that are incorporated herein by reference in their entirety: U.S. Pat. Nos. 7,734,517; 7,689,490; 7,769,654; 8,694,413; 8,825,539; 8,566,146; U.S. Pub. No. 2010/0290603; U.S. Pub. No. 2013/0132145; and WO 2007/038587 A2.

The computer system 24 may comprise, as shown in the example of FIG. 1: an client engagement score module 30 for computing the interest signals and the client engagement scores for the clients; a random forest model 32 that is trained to compute the predicted client interest scores for the clients based on the client engagement scores from the client engagement score module 30 as well as trades and holdings of the investment fund associated with the client; and an embeddings model 34 that computes the embeddings for the clients and the research entities/topics.

Figure 2:
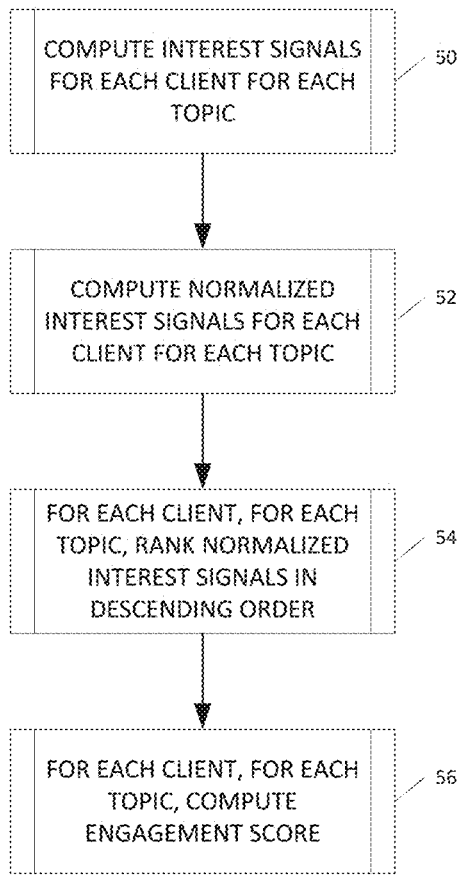
FIG. 2 is flow chart of a process flow executed by the computer system of FIG. 1 to compute client engagement scores for clients of the research organization according to various embodiments of the present invention.

Based on the data in the databases described above, the computer system 24, by executing software of the client engagement score module 30, can compute the interest signals and client engagement scores for a collections of the clients (e.g., all of the clients or a subset of them) for each of the research topics (e.g., all of the topics or a subset of them). FIG. 2 is a flow chart depicting a process flow of the computer system 24, executing the software of the client engagement score module 30, to compute the interest signals and client engagement scores according to various embodiments of the present invention. At step 50, the computer system 24 can compute interest signals 26 (see FIG. 1) for each client in the collection of clients for each of the topic in the collection of topics. Again, the topics could be tickers, industries and fixed income asset classes, for example, with or without a geographic scope. In various embodiments, the interest signals 26 include interest signals for readership, interactions, read concentration, time on web portal, subscriptions, corporate meetings, model downloads and email opens. These interest signals are described below. Additional interest signals could be used in other embodiments in lieu of or addition to some of the listed interest signals.

The readership interest signal for a particular topic for a particular client can indicate how many pieces of work product that client accessed via the web portal pertaining to the particular topic. The topic(s) of each work product is stored in the work product database 12. The data about the work products accessed by the clients are stored in the web portal database 14. By cross-referencing the topic(s) for each work product accessed by the client, the computer system 24 can determine the clients' readership scores for each topic. The score for a particular client for a particular topic can be a count for the number of pieces of work product accessed by the client pertaining to the topic over a recent time period (e.g., most recent 6 months, etc.). Also, in various embodiments, more recent reads may be weighted more heavily than reads that were longer ago. For example, a read within the past 12 months could count as 1.0; a read 12 to 24 months ago could count as 0.5; and a read more than 24 months ago could count as 0.2.

The interactions interest signal for a particular client for a particular topic could be a score based on at least the subject client's interactions with the research team for that topic as a percentage of all interactions by the subject client with research teams across the research organization over an observation period (e.g., 2 years or some other time period). For example, the total duration of meeting and calls (e.g., phone or video calls) involving or between a particular analyst team and the client during the observation period could be divided by the cumulative duration of all meetings and calls that the client had with all analyst teams for the research organization. For example, if the client's meeting and call duration for the observation period with one analyst team was fifteen (15) minutes, and the cumulative duration of all meetings and calls that the client had with all analyst teams during the observation period was seventy-five (75) minutes, the client's interaction duration percentage, e.g., interaction interest signal, for that analyst team would be 20% (or 0.20). Because each analyst team generally covers an industry, the interaction score for a particular analyst team can be a proxy for the client's interaction interest signal for the industry covered by the analyst team. Further, to the extent the calls and/or meetings pertained to a particular ticker(s) or fixed income asset class(es), that information can be logged in the interactions database 18 so that interaction interest signals for the clients can be determined at the ticker and/or assert class level.

The read concentration signal can show, for each client for each topic, how concentrated the client's reads, based on downloads from the web portal, were on that topic compared to other topics. For example, if a client downloaded 100 items of work product from the web portal over an observation period, and 17 of those work product items pertained to a particular topic, e.g., ticker ABC, then the client's read concentration in ticker ABC could be computed as 17/100=0.17. Similarly, if 35 of the work piece items pertained to a particular industry, the client's read concentration for that industry could be computed as 35/100=0.35. In this or a similar manner, the read concentration for each client in the collection of clients, for each topic in the collection of topics, could be computed.

The "time on web portal" interest signal can be computed similarly to the readership interest signal but based on the time each client spent on certain webpages of the web portal. The signal is normalized by comparing to the maximum time that any client spent on the related web portal pages pertained to a particular topic over a recent time period. For example, if over the observation period the client spent 30 minutes on the web portal page(s) related to the pharmaceuticals industry in North American, and the maximum client's time on web portal pages for the North American pharmaceuticals industry duration that period is 100 minutes, then the client's "time on web portal" interest signal could be computed as 30/100=0.30. In this or a similar manner, the time on web portal interest signal score for each client in the collection of clients, for each topic in the collection of topics, could be computed.

The model downloads, and email opens interest signals can be computed in similar manners to the "time on web portal" interest signal. In a related manner, if the client downloaded 5 models from the web portal about ticker ABC, and the maximum ABC ticker model downloaded by one client is 25, over the observation period, the client's model download interest signal score for ticker ABC could be computed as 5/25=0.20. The "email opens" interest score could be computed in a similar manner The subscriptions and corporate meetings signals can be binary indicators. If the client subscribes a company (e.g., ticker), the client's "subscription" interest score is 1 for that company/ticker. If the client does not subscribe to the company, the client's subscription interest score is 0. Similarly, if a client attended at least one corporate access meeting of company ABC during the observation time, the client's "corporate access meeting" interest score is 1; otherwise, it is 0.

In other embodiments, other interest signals could be used in addition to the interest signals listed in FIG. 1. Such other interest signals could also be used in place of one or more of the interest signals listed in FIG. 1. Further, the observation periods for the interest signals could be the same or different across the various interest signals. For example, the observation period for email opens could be different (e.g., longer or shorter) from the observation period for time on the web portal, etc. Also, the weighting for hits in the observation periods for some or all of the interest signals could vary with time. For example, more recent hits could be weighted more heavily than hits longer ago in the observation period.

With reference to FIG. 2, at step 52, the computer system 24, executing the software of the client engagement score module 30, can compute normalized interest signal scores for each client for each topic, such as normalized between 0.0 and 1.0 inclusive. In this discussion, let the interest signals be denoted as k=1, K, such that there are K interest signals. In various embodiments, there could be the eight interest signals (e.g., K=8) as shown in FIG. 1. The normalized interest signal score, for interest signal k, for a client j for a topic T, may be computed conventionally such as, for example, $S_{norm,k,j,T} = (S_{raw,k,j,T} - Min_{k,T})/(Max_{k,T} - Min_{k,T})$, where $S_{norm,k,j,T}$ is the normalized score for interest signal k for client j for topic T, $S_{raw,k,j,T}$ is the raw interest signal score for interest signal k for client j for topic T, $Min_{k,T}$ is the minimum raw interest score for topic T for interest signal k across all clients, and $Max_{k,T}$ is the maximum raw interest score for topic T for interest signal k across all clients. In other embodiments, the raw interest scores could be winsorized prior to computation of the normal interest signal scores, such as a 90% winsorization, which sets all observations greater than the 95th percentile equal to the value at the 95th percentile and all observations less than the 5th percentile equal to the value at the 5th percentile. Regardless of whether winsorized scores are used, at step 52, therefore, the computer system 24 can compute the normalized interest signal score for each interest signal for each client for each topic.

At step 54, the computer system 24 ranks, or orders, in descending order, the normalized interest scores for each client for each topic. If, for example, the system uses K different interest signals, then for each client for each topic, the computer system 24 ranks the normalized interest signal scores from first to Kth, such that the first score is the greatest score for the client for the topic and the Kth score is the lowest score for the client for the topic. If two or more interest signals have equal normalized scores, they can be ranked arbitrarily. For example, if two scores tie for $2^{nd}$ greatest, one score can arbitrarily be ranked $2^{nd}$ and the other score can be ranked $3^{rd}$.

At step 56, the computer system 24 computes the engagement score for each client for each topic. Preferably, the engagement score for a client for a topic is computed as a weighted average of the client's normalized interest signal scores for the topic (i.e., $S_{norm,k,j,T}$) across all interest signals K, where the client's higher (that is, greater) ranked normalized interest signal scores (from the ranking computed at step 54) are weighted more heavily that the client's lower ranked normalized interest signal scores for the topic. Preferably, the $1^{st}$ ranked score is weighted greater than the $2^{nd}$ ranked score; the $2^{nd}$ ranked score is weighted greater than the $3^{rd}$ ranked score; and so on. Preferably, an exponential decay weighting for interest signal normalized scores is used. For example, assuming k=1, . . . ,K different interest signals (e.g., eight different interest signals as shown in FIG. 1), a client's engagement score for topic T can be computed as, $$ES_{j,T} = \sum_{k=1}^{N} w_k * S_{norm,k,j,T},$$

where $ES_{j,T}$ is the client j's engagement score for topic T, $w_k$ is the weight for the kth ranked interest signal score for the client, and $S_{norm,k,j,T}$ is the normalized interest signal score for client j, for interest signal k, for topic T. With exponential decay weighting, the weights $w_k$ can be computed as $$w_k = \exp(-1.5 * k) / \left( \sum_{k=1}^{K} (\exp(-1.5 * k)) \right).$$

Figure 3:
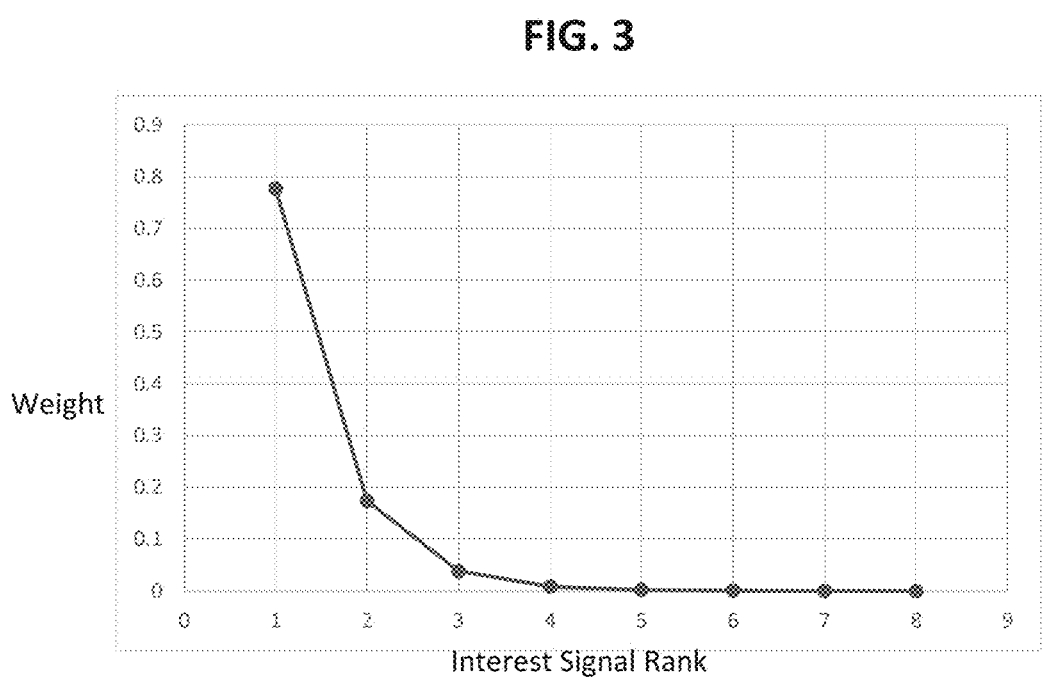
FIG. 3 depicts weightings for normalized interest signal scores used in computing the client engagement scores according to various embodiments of the present invention.

In an embodiment where eight interest signals are used (e.g., see FIG. 1), the weight for a client's highest ranked interest signal score can be, in such an embodiment, approximately 0.777, the weight for the $2^{nd}$ highest ranked interest signal score is approximately 0.173, and the weights for the $6^{th}$, $7^{th}$ and $8^{th}$ ranked interest signals are less than 0.001. FIG. 3 shows the exponential decay of the weights according to such an embodiment where there are eight interest signals.

Figure 4:
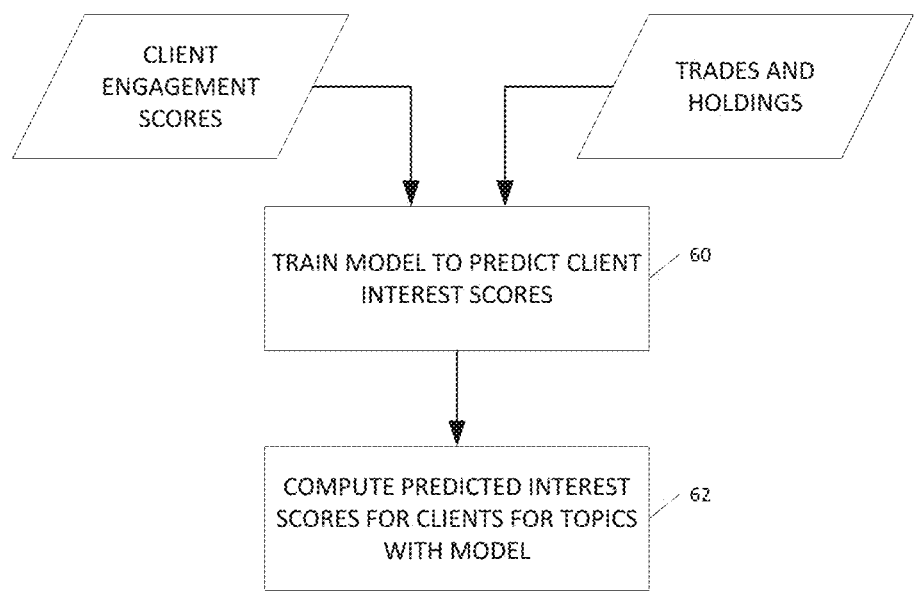
FIG. 4 is flow chart of a process flow executed by the computer system of FIG. 1 to compute client interest scores for clients of the research organization according to various embodiments of the present invention.

FIG. 4 is a diagram of a process flow for the computer system, by executing software of the random forest module 32, to compute predicted client interest scores for the clients for the topics. With reference to FIG. 4, the clients' engagement scores can be used to train, at step 60, a machine learning model, such as a random forest model, to compute the predicted client interest scores for the clients for the various research entities/topics that a predictive of the clients' interests in the research topics respectively. The client engagement scores (computed at step 56 in FIG. 2) can be used as training data labels for the machine learning model, e.g., random forest; and other data associated with the clients can be used as the training data features. The data that can be used for the features include, for example: trades and holdings data (stored in the database 16) for the investment fund(s) associated with the clients; broker vote data for the clients; whether the client has "super" interest in the topic; interaction counts and durations, such as for all types of interactions, and the recency of such interactions; and whether the entity/topic is the focus of recent reads and interactions by the client.

A broker vote is a process used by buy-side firms to assess the value of provider services, such as research, in order to determine how commissions will be allocated for trade execution for trades involving the buy-side firms that are executed by the sell-side firms. The broker vote is used by the buy side as a way to holistically evaluate the quantitative and qualitative value of research providers, whose services include corporate access events, bespoke events, research reports and analyst models, as described herein. Based on the results of the vote, the firm determines how much to pay each research provider, e.g., sell-side firm, and the trading desk of the buy-side firm allocates trading business to its sell-side research providers in accordance with the vote results. A client's broker votes can be used as features for the decision tree models by including, as a feature, the client's vote for the sell-side firm. For example, the higher the client ranked the sell-side firm in the broker vote, the higher the value for the broker vote feature in the decision tree model training. The broker votes could also be a binary feature; if the client voted for the sell-side firm in any position, then the broker vote feature is 1; otherwise it is 0. Similarly, super interests, recent interactions, and recent focuses can be used as features for the decision tree models.

The random forest can use bagging in various embodiments as described herein. Numerous decisions trees (e.g., a proverbial forest), such as one hundred or more decision trees, can be created using bootstrapped datasets from the trades and holding data. The nodes for the trees can be decision points such as ticker ABC, or tickers in a certain industry, comprises more than x % of the client's fund by dollar value; or that more than x % (by dollar amount) of the fund's trades over an observation period involved ticker ABC, or tickers in a certain industry, etc. The leaves (end-points) for each tree can be a narrow range of engagement scores computed by the client engagement score module 30 (e.g. engagement scores from 0.0 to 1.0 by 0.10). Not every feature from the holdings and trades data can be used to train each tree in the forest; instead, randomly selected features from the holdings and trades data can be used to train the trees. The score, e.g., a so-called "client interest score," for a client for a topic can be an aggregation (e.g., averaging) of the scores from each tree in the forest for the topic given the client's trades and holdings data. Once trained, therefore, the model (e.g., the random forest) can be used to compute client interest scores that are predictive, for each client, for each topic, of the client's interest in the topic from the holdings and trades for the fund(s) associated with the client. The random forest model can be trained so that the client interest scores range from 0.0 to 1.0, for example. Once the model is trained, client interest scores can computed, at step 62, for the clients based on their associated trades and holdings.

Next, the computer system 24, by executing software of the embeddings model 34, can compute an embedding for each client (or a subset of them) and an embedding for each research topic (or a subset of them). The embeddings can be M-dimensional vectors, where each value in the vector is number, and such that, when plotted in a relevant M-dimensional embedding space, vectors for clients with similar engagements are close (e.g., have a relatively small Euclidean or cosine distance) and research topics with similar client engagements are close (e.g., have a relatively small Euclidean or cosine distance). Each client vector preferably has the same dimension and each research topic vector preferably has the same dimension. The client vectors can have the same dimension as, or a different dimension than, the research entity vectors. The dimension of the vectors should be at least 10, and preferably 50 to 200, and more preferably about 100, for example. Shorter vectors are faster to compute, but provide less resolution. Longer vector conversely require greater computation time, but provide greater resolution.

Figure 5:
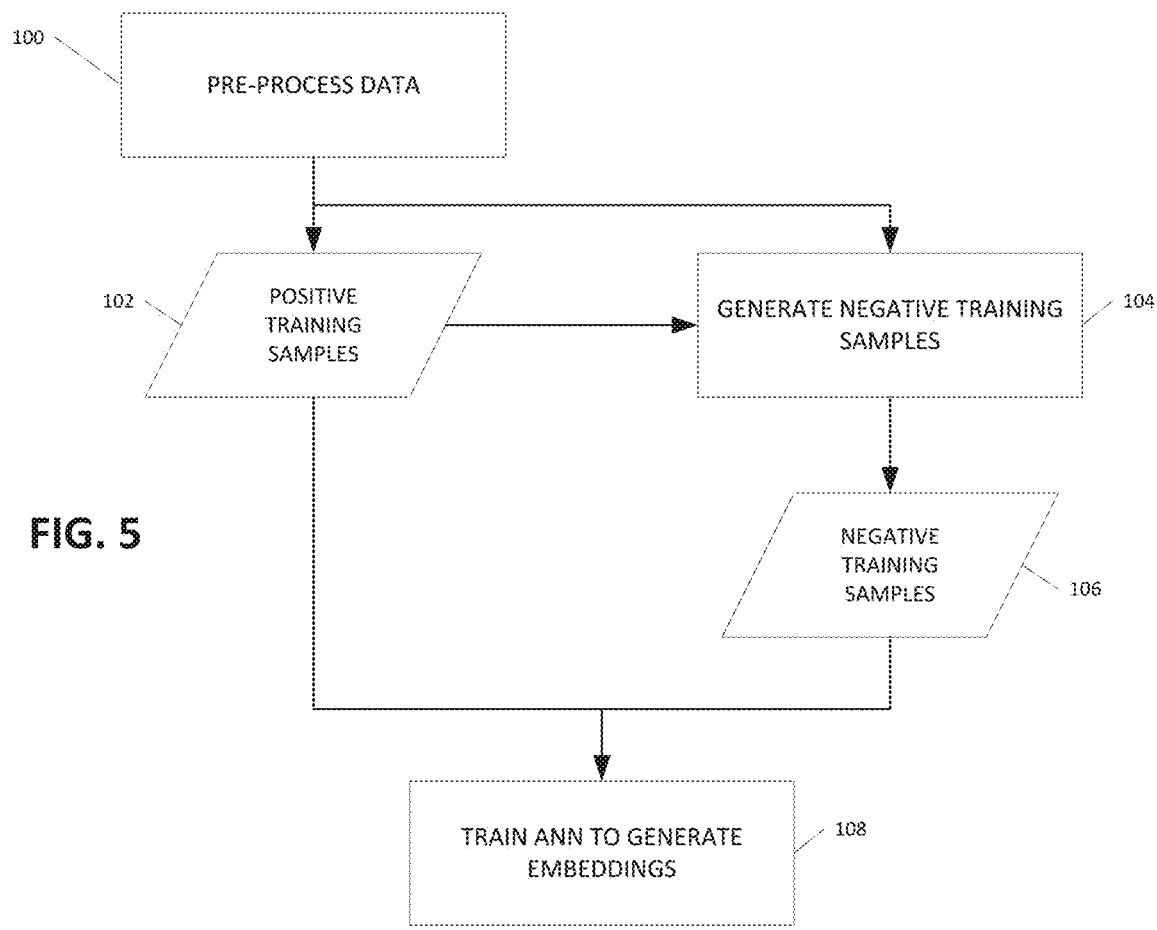
FIG. 5 is flow chart of a process flow executed by the computer system of FIG. 1 to compute client and research entity embeddings according to various embodiments of the present invention.

The embeddings can be computed with an artificial neural network (ANN) trained iteratively with both positive and negative training samples generated from the client interest scores from the random forest model 32 to thereby digitalize the client interest profiles and research entities/topics. FIG. 5 is a diagram of how the ANN can be trained. At step 100, the client interest profiles from the random forest model 32 can be pre-processed. This can include, for example, removing client interest scores for a topic below a threshold level. For example, if client A has a low interest in Ticker ABC (e.g., client interest score for client A for Ticker ABC less than the threshold), then the client-interest score for client A for Ticker ABC can be removed in this pre-processing step 100. The pre-processing can also include removing research entities/topics that have less than a threshold number of client followers. That is, if a research entity/topic has less than the threshold number of clients with an interest score above 0.2 for the topic, that research entity/topic can be removed from the profiles.

Client interest profiles that are not removed in the pre-processing step 100 can then constitute positive training samples 102 for the ANN. That is, these samples will constitute clients with interest scores for a topic greater than the applicable threshold value. And there will be a threshold number of such clients for each research entity/topic as a result of the pre-processing at step 100. At step 104, negative training samples 106 can be randomly generated based on both the pre-preprocessing (step 100) and the positive training samples 102. The negative training samples 106 can be, for example, for each client, a number of randomly picked topics that the client is not interested in, e.g., has a client interest score less than a threshold value.

Figure 6:
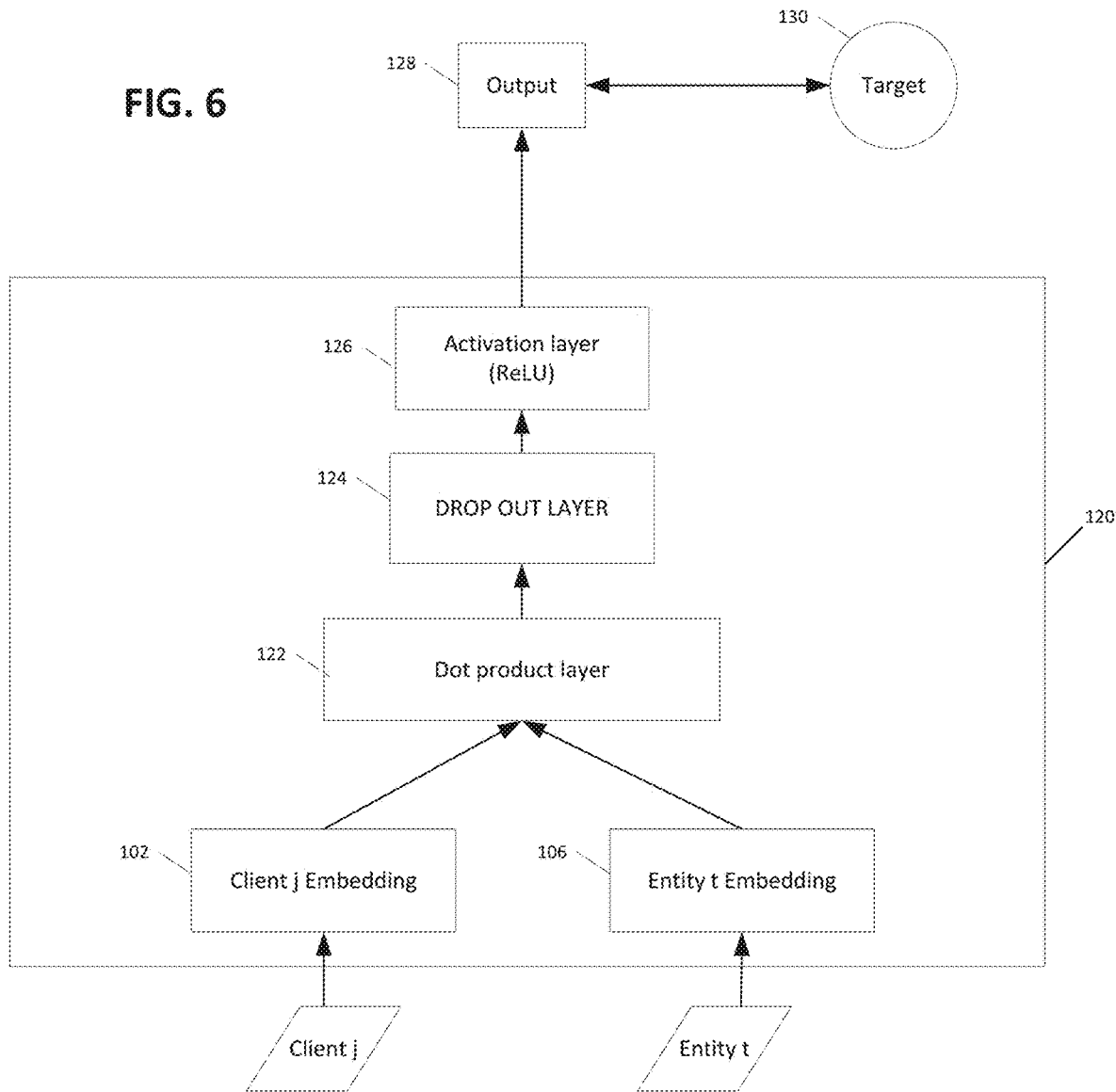
FIG. 6 is a diagram of an artificial neural network used to compute the embeddings according to various embodiments of the present invention.

The positive and negative training samples can then be used, at step 108, to train the ANN. FIG. 6 illustrates an example of the ANN 120 according to various embodiments. The inputs to the ANN 120 include embedding layers 102, 106 for a particular client (e.g., client j) for a particular research entity/topic (e.g., entity t) (e.g., clients and entities that survived the pre-processing step 100). The training samples could be positive (i.e., the client has a sufficient interest in the topic) or negative (the client does not have a sufficient interest in the topic). Table 1 below illustrates some exemplary training samples. The first training sample is for the client who corresponds to Client ID 1 and for the entity corresponding to Entity ID 001. In this example, Client ID 1 has a normalize interest score of 0.95 for Entity ID 001, which can be considered a positive training sample (i.e., the client has an interest in the entity) because the client's normalized interest score is greater than a threshold, such as zero (0) or some greater threshold. Sample number 2 is for the same client (i.e., Client ID 001), but for a different entity, Entity ID 002, for which client does not have an interest (e.g., normalized interest score is 0). This is a negative training sample. A number of such training samples, both positive and negative, can be randomly generated. The inputs to the ANN 120 for a particular training sample can be the combination of the client's embedding 102 and the entity's embedding 106. The embeddings can be vectors (or tensors) as described above.

TABLE 1

| Sample No. | Client ID | Entity ID | Score (0-Negative samples) |
|---|---|---|---|
| 1 | 001 | 001 | 0.95 |
| 2 | 001 | 002 | 0 |
| 3 | 002 | 005 | 0.58 |
| ... | ... | ... | ... |
| N | K | T | 0 |

The ANN 120 can include a dot product layer 122 that calculates the similarity of client j and topic entity t. In particular, it can compute the dot product of the two embeddings 102, 106. In a forward propagation through the ANN 120, following the dot product layer 122, a dropout layer 124 can drop out nodes from the dot product layer 122 according to a dropout probability hyperparameter in each iteration, which can have the effect of avoiding overfitting of the model to the training data. Next, in forward propagation, a ReLU activation layer 126 can compute an output 128 for the training sample used in the training iteration (either a positive or negative training sample). The ReLU activation function captures the pattern of observed positive samples and unobserved negative samples. For a particular input, the output can be a score indicative of whether the client is interested in the topic. That computed score can be compared to a training target 130, which can be the client-interest score for the client for the topic computed from the random forest model 32 (see step 62 of FIG. 4) if it is a positive sample, or 0 if it is a negative sample. Based on the comparison, an error can be back-propagated through the ANN 120 to update the weights for the branches of the network, according to known iterative, neural network training techniques, including the nodes for the embedding layers 102 and 106, to minimize the error. A mean squared errors function, or some other suitable loss function, can be used to compare the outputs 128 to the training targets 130, such that the error is used to update the connection weights until the error, for each training sample, is sufficiently minimized. Following the training, the result can be embeddings (e.g., connection weight values for the embedding layers 102, 106) for each client and for each research entity (that survived the pre-processing step).

Figure 7:
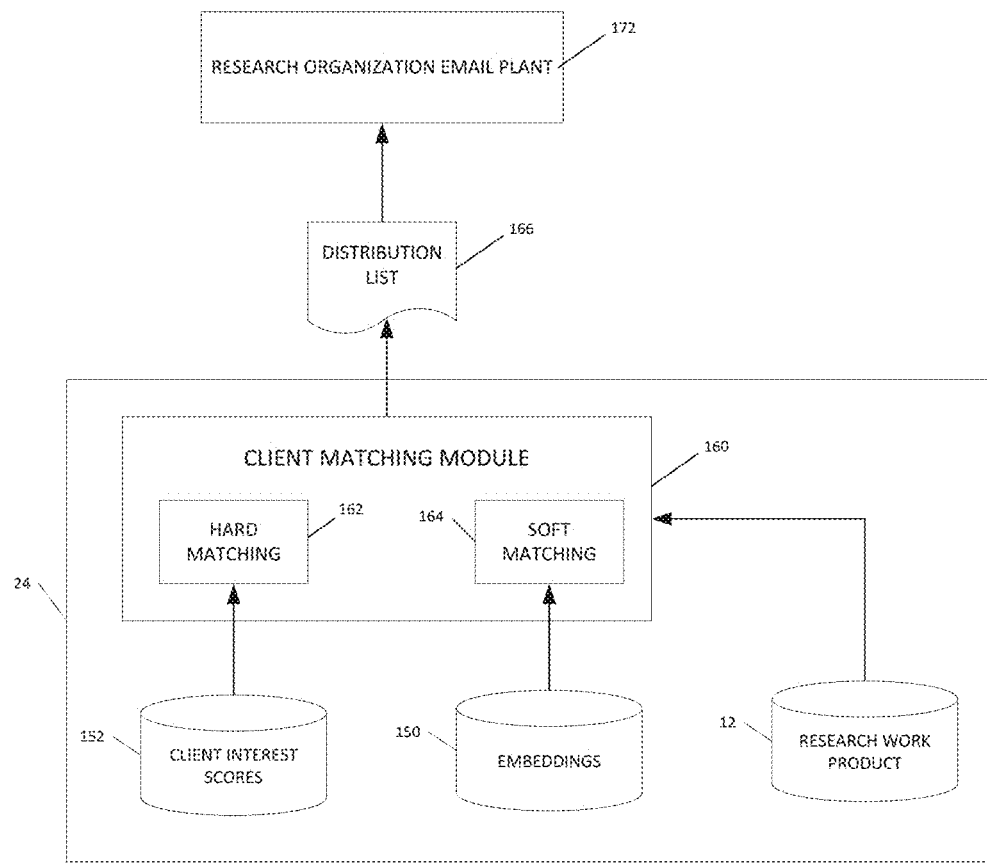
FIG. 7 is a diagram of the computer system of FIG. 1 determining a client distribution list for research work product produced by the research organization according to various embodiments of the present invention.

With reference to FIG. 7, the client and research entity embeddings computed from the ANN 120 can be stored in a database 150 of the computer system 24. A client-interest scores database 152 can store the client-interest scores computed from the random forest model 32. That way, in a deployment mode of operation, the computer system 24 can determine, using both the embeddings and the client-interest scores, whether to distribute a particular piece of research work product from the research organization (i.e., a newly published piece of research work product) to particular clients of the research organization.

Data about the research work product item to be distributed can be stored in the research work product database 12. A client matching software module 160 of the computer system 24 can perform hard matching 162 of clients to research topics based on the client interest scores 152 from the random forest model 32, and can also perform soft matching 162 of clients to research topics based on the embeddings 150 from the embeddings ANN 120, to, in both types of matching, identify clients with a sufficient interest in a topic(s) covered be a research work product item to be distributed. The output from each matching process can be combined to create a distribution list 166 for a piece of research work product to be distributed (e.g., via email) to clients.

For example, if a research work product item pertains to topic A, the hard matching process 162 can identify all clients with an interest in topic A above some threshold value. The clients whose interest in topic A meets or exceeds the threshold value for distribution can be marked for distribution of the research work product item; i.e., the clients can be included in the distribution list 166. If a research work product item pertains to multiple topics, the hard matching process 162 can include a client for distribution of the research work product item if the client's interest in at least one of the multiple topics exceeds the threshold value.

The soft matching process 164 can identify additional clients for distribution of the research work product item based on whether the embeddings for the clients are sufficiently close to the embeddings for one or more clients that are predicted to have a sufficiently high interest in the research work product item from the hard matching 162. That is, the embeddings can correspond to points in a multi-dimensional space. In various embodiments, one or more clusters of clients from the hard matching that have a sufficiently high interest in the research work product item can be identified using a clustering algorithm, such a density-based or centroid-based (such as k-means) clustering algorithm. The soft-matching process 164 can add other clients in the cluster(s) to the distribution list 166.

Additionally or alternatively, the client matching module 152, using the soft-matching process 164, can identify other research topics whose embeddings are the nearest neighbors to the embedding for each topic in the research work product item (e.g., the K nearest neighbors) in the research entity/topic embedding space. Clients with a high interest in the nearest neighbor topics (based on the client-interest scores 152) can also be included in the distribution list 166. For example, if the research work product item pertains to topic A and topic A is close to topic B in the research entity embedding space. And client X is not known to have a high interest in topic A (e.g., because client X and/or topic A are relatively recent to the research organization), but client X is known (from the client interest scores 152) to have a high interest in topic B, then client X can be included in the distribution list for the research work product item pertaining to topic A.

The distribution list 166 can be transmitted electronically to an email plant 172 for the research organization. The computer-based email plant 172 may be implemented as one or more computer servers that handle the email protocol for the research organization, including sending emails to clients of the research organization about research work product items of the research organization. When a new research work product item is ready for distribution, the distribution list 166 for the research work product item can be determined by the client matching module 160 based on the data about the research work product item (e.g., the topics to which it pertains), the client-interest scores 152 and the embeddings 150. The client-interest scores 152 and embeddings 150 can be computed beforehand, i.e., before determination of the distribution list 166. The client-interest scores 152 and embeddings 150 can be computed periodically at a periodicity that is suitable for the research organization, such as daily, weekly, monthly, etc. They do not need to be re-computed each time there is a new research work product item to distribute.

The embeddings and client interest scores can be used for other purposes besides distribution of research work product. For example, the embeddings can be used to identify other clients to introduce to research teams of the research organization. If client A interacts closely or often with a particular research team, but client B does not, even though the embeddings for clients A and B are close, the research organization can identify client B, based on the close proximity of client B's embedding to client A's embedding, to introduce to the research term. As another example, the embeddings can be used to invite clients to particular events. For example, if Ticker ABC is having an investor event, and the embedding for Ticker ABC is close to the embedding for Ticker BCD, and client A has a high client interest score for Ticker BCD but not for Ticker ABC (such as because Ticker ABC and/or client A are new to the research organization), then client A could be invited to the investor event for Ticker ABC.

Figure 9:
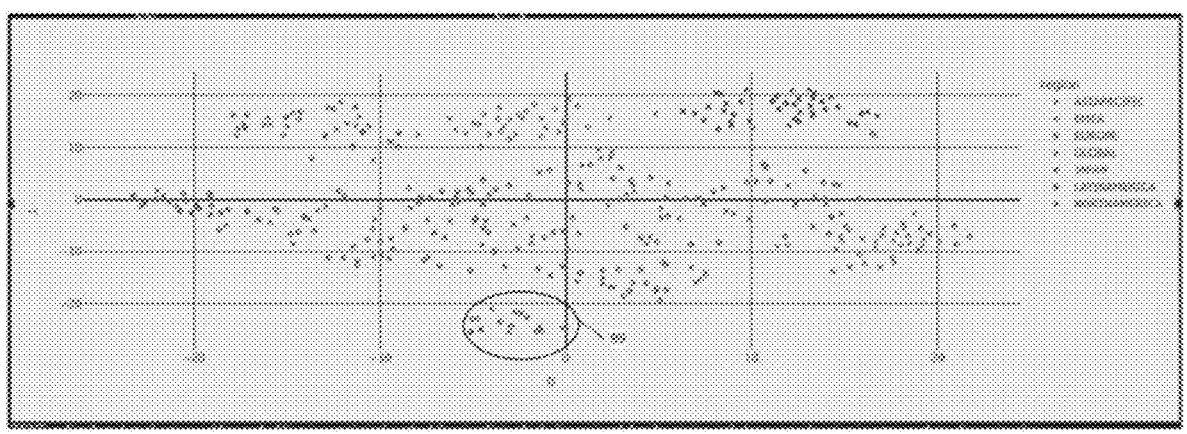
FIG. 9 shows an example of the research entity embeddings in a t-distributed stochastic neighbor embedding (tSNE).

As another example, the embeddings can be used to discover research entities with similar client engagements. FIG. 9 shows an example of the research entity embeddings in a t-distributed stochastic neighbor embedding (tSNE). This graph shows how close entities, e.g., entities within a k-mean cluster, can be identified. For example, the cluster 99 in the example of FIG. 9 includes the US pharmaceuticals, US biotechnology, Japan pharmaceuticals, Europe pharmaceuticals, and US medical technology industry sectors. Because these sectors/entities are close (e.g., entity embeddings within the cluster), the research organization could distribute work product about one of the sectors to clients that have a significant client engagement with another entity/sector in the cluster.

Figure 8:
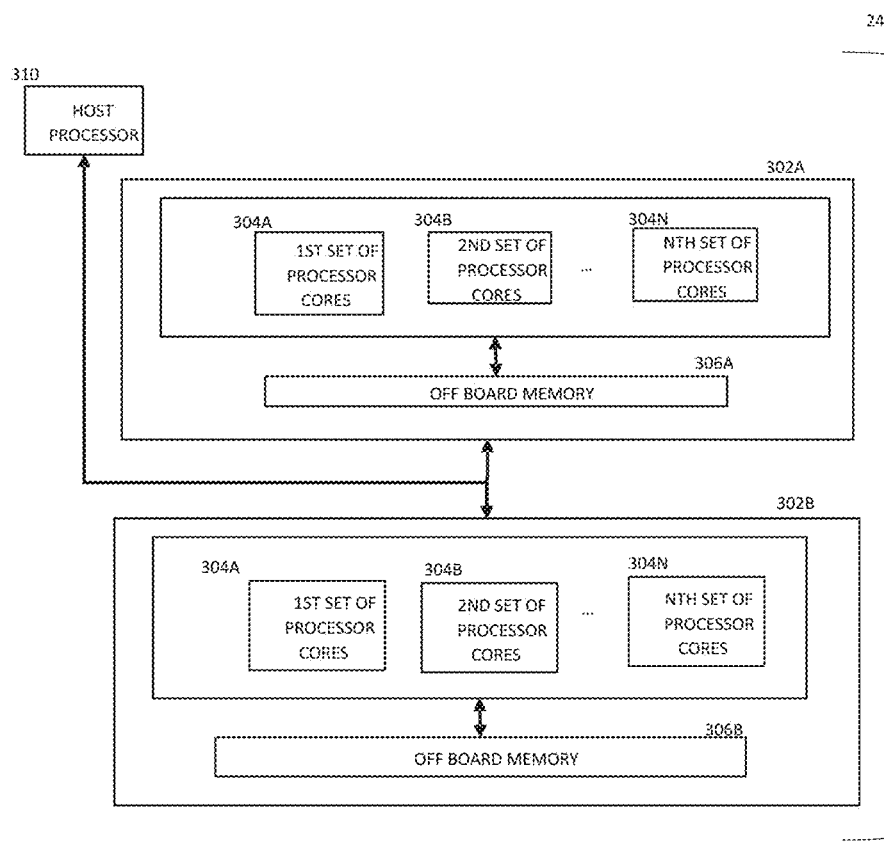
FIG. 8 is a diagram of the computer system of FIG. 1 according to embodiments of the present invention.

FIG. 8 is a diagram of the computer system 24 that could be used to train the random forest model and/or embeddings ANN. The illustrated computer system 24 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may implement different steps of various processes and procedures of the computer system 24 described above. For example, in one embodiment, the cores of the first processor unit 302A may implement the random forest model and the second processor unit 302B may implement the training process for ANN 120. Also, one or more processor cores could implement the client engagement score module 30 and the client matching module 160.

One or more host processors 310 may coordinate and control the processor units 302A-B. The process depicted in various figures can be embodied as a set of instructions stored within a memory (e.g., an integral memory of the processing units 302A, 302B or an off board memory 306A couple to the processing units 302A, 302B or other processing units) coupled to one or more processors (e.g., at least one of the sets of processor cores 304A-N of the processing units 302A,302B or another processor(s) communicatively coupled to the processing units 302A,302B), such that, when executed by the one or more processors, the instructions cause the processors to perform the aforementioned processes by, for example, executing the software for the client engagement score module 30, the random forest model 32, the embeddings model 34 and the client matching module 160.

In other embodiments, the computer system 24 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet). For example, the computer system 24 could be implemented via cloud computing, such as using, for example, cloud computing platforms from Snowflake Inc. and/or Databricks. Snowflake allows the research organization's data, such as the client engagement data, to be stored and analyzed using cloud-based hardware and software. Snowflake runs on Amazon S3, Microsoft Azure and/or Google Cloud Platform. Databricks is a cloud-based unified data analytics platform that enables organizations, such as the research organization here, to process, store, and analyze large volumes of data at scale, such as the client engagement data here. Databricks uses a cloud-naïve architecture that works with various cloud providers, such as Amazon Web Services (AWS), Microsoft Azure, and Google Cloud Platform.

The software for the various computer systems and modules (e.g., modules 30, 32, 34 and 160) described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, CUDA, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer systems and computer-implemented methods for a research organization, such as a sell-side firm. A computer system according to the present invention can comprise a database system for storing client engagement data for clients of the research organization, wherein the client engagement data comprise data indicative of engagement by a collection of clients with the research organization. The computer system can also comprise one or more processors, and computer memory that is in communication with the one or more processors. The computer memory stores computer instructions that when executed by the one or more processors, cause the one or more processors to compute, for each client in the collection of clients, for each of certain research topics covered by the research organization, a client-interest score, based on the client engagement data for the client. The client-interest scores are computed using a first machine learning model that is pre-trained to compute the client-interest scores from, at least in part, the client engagement data. The computer memory also stores instructions that when executed by the one or more processors cause the one or more processors to compute embeddings for each of the clients and embeddings for each of the certain research topics. The embeddings are computed using a second machine learning model, such that embeddings for clients with similar interests are close, distance-wise, in a client embedding space, and such that embeddings for certain research topics with similar client engagements are close, distance-wise, in a research topic embedding space. The second machine learning model is trained to compute the embeddings with both positive and negative training samples from the client-interest scores.

A method according to embodiments of the present invention comprises the step of storing, in a database system, client engagement data for clients of a research organization, where the client engagement data comprise data indicative of engagement by a collection of clients with the research organization. The method also comprises the step of computing, by a computer system that is in communication with the database system and that comprises one or more processors, for each client in the collection of clients, for each of certain research topics covered by the research organization, a client-interest score, based on the client engagement data for the client. Computing the client-interest scores comprises computing the client-interest scores with a first machine learning model that is pre-trained to compute the client-interest scores from, at least in part, the client engagement data. The method also comprises the step of computing, by the computer system, embeddings for each of the clients and embeddings for each of the certain research topics, wherein the embeddings are computed using a second machine learning model, such that embeddings for clients with similar interests are close, distance-wise, in a client embedding space, and such that embeddings for certain research topics with similar client engagements are close, distance-wise, in a research topic embedding space, wherein the second machine learning model is trained to compute the embeddings with both positive and negative training samples from the client-interest scores.

In various implementations, the second machine learning network comprises an artificial neural network (ANN); the positive and negative training samples are randomly generated; and the embeddings comprise M-dimensional vectors, wherein M is greater than 10.

In various implementations, the embeddings comprise updated weights for connections of the ANN through training of the ANN to minimize errors of outputs of the ANN relative to training targets for the positive and negative samples.

In various implementations, the computer system: computes, for each of the clients, for each of the certain research topics, from the client engagement data, a client engagement score; and trains the first machine learning model based on the client engagement scores.

In various implementations, the client engagement scores are computed by, for each client, for each of the certain research topics: computing a plurality of normalized interest signal scores based on the client engagement data; ranking the plurality of normalized interest signal scores in descending order, to thereby generated a ranked order of normalized interest signal scores for the client for the certain research topic; and computing the client engagement score for the client for the certain research topic based on a weighted average of the plurality of normalized interest signal scores for the client for the certain research topic, such that a higher ranked normalized interest signal score is weighted greater than a lower ranked normalized interest signal score. In various implementations, the ranked order of normalized interest signal scores is weighted according to an exponential decay weighting function.

In various implementations, the research organization comprises a financial securities research organization that produces research work product pertaining to tickers, industries, and investment asset classes, such that the certain research topics comprise the tickers, the industries, and the investment asset classes. Also, each of the clients can be related to one or more investment funds. Also, the database system can further store data indicative of trades and holdings of the one or more investment funds. Still further, the first machine learning model can be pre-trained to compute the client interest scores based on, at least in part, the trades and holdings of the one or more investment funds.

In various implementations, the first machine learning model comprises a random forest model. The second machine learning network can comprise, as mentioned above, an artificial neural network (ANN); where the positive and negative training samples are randomly generated; and where the embeddings comprise M-dimensional vectors, where M is greater than 10. The embeddings can comprise updated weights for connections of the ANN through training of the ANN to minimize errors of outputs of the ANN relative to training targets for the positive and negative samples. The computer system can further be programmed to, for each of the clients, for each of the certain research topics, from the client engagement data, compute a client engagement score and train the random forest model based on the client engagement scores.

In various implementations, the computer system can compute the client engagement scores by, for each client, for each of the certain research topics, by, among other things: computing a plurality of normalized interest signal scores based on the client engagement data; ranking the plurality of normalized interest signal scores in descending order, to thereby generated a ranked order of normalized interest signal scores for the client for the certain research topic; and computing the client engagement score for the client for the certain research topic based on a weighted average of the plurality of normalized interest signal scores for the client for the certain research topic, where the ranked order of normalized interest signal scores are weighted according to an exponential decay weighting function, such that a higher ranked normalized interest signal score is weighted greater than a lower ranked normalized interest signal score.

Still further, in various implementations, the plurality of normalized interest signal scores can comprise at least a read concentration interest signal score, for a client for a research topic, indicative of a concentration of research work product items produced by the research organization accessed by the client pertaining to the topic from a web portal of the research organization relative to all work product items produced by the research organization accessed by the client from the web portal.

Further yet, in various implementations, the plurality of normalized interest signal scores additionally comprise two or more of the following interest signal scores: a readership interest signal score, for a client for a research topic, indicative of research work product items produced by the research organization accessed by the client pertaining to the topic from the web portal of the research organization; an interaction interest signal score, for a client for a research topic, indicative of communication interactions by the client with one or more analysts of the research organization pertaining to the topic; a web portal time interest signal score, for a client for a research topic, indicative of time spent, by the client, on web pages of the web portal of the research organization pertaining to the topic; a subscription interest signal score, for a client for a research topic, indicative of subscriptions of the client for research work product of the research organization; a corporate meetings interest signal score, for a client for a research topic, indicative of attendance by the client at a corporate meeting pertaining to the topic; a model downloads interest signal score, for a client for a research topic, indicative of a number of models downloaded by the client from the web portal of the research organization pertaining to the topic; and an email opens interest signal score, for a client for a research topic, indicative of a number of emails, pertaining to the topic, from the research organization to the client, opened by the client.

In various implementations, the computer system can further be configured, through software, to determine a distribution list of clients for a research work product item from the research organization, where the distribution list is determined based on the client-interest scores and the embeddings. In that connection, the computer system can further comprise one or more email servers for emailing, to the clients on the distribution list, a link on a web portal of the research organization to the research work product item.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system for a research organization, the computer system comprising:
   a database system for storing client engagement data for clients of the research organization, wherein the client engagement data comprise data indicative of engagement by a collection of clients with the research organization, wherein the data indicative of engagement comprise:

data indicative of downloads by clients of research work product from a web portal of the research organization; and data indicative of communication interactions between the client and personnel of the research organization;

one or more processors; and computer memory in communication with the one or more processors, wherein the computer memory stores computer instructions that when executed by the one or more processors, cause the one or more processors to:

compute, for each client in a collection of clients, a client engagement score, for each of certain research topics of the organization, based on the client engagement data for the client;

train, via machine learning, a first machine learning model to compute a client-interest score for each client for each of the certain research topics, such that the client-interest score for each client for each research topic is a numerical value in a continuous range of non-binary values indicative of interest of the client in the research topic, wherein the first machine learning model comprises a random forest with a plurality of decision trees, and wherein the client engagement scores are used as training data labels for training the random forest;

train, via machine learning, a second machine learning model to compute multi-dimensional embeddings for clients and multi-dimensional embeddings for each of the certain research topics, wherein the second machine learning model is trained to compute the embeddings with both positive and negative training samples from the client-interest scores, wherein the second machine learning model comprises a deep artificial neural network ("ANN"), wherein the ANN comprises a dot product layer and drop-out layer, and utilizes a rectified linear unit ("ReLU") activation function, wherein the ANN is trained to calculate a similarity of each client in the collection of clients to each research topic, and wherein the embeddings comprise updated weights for connections of the ANN through training of the ANN to minimize errors of outputs of the ANN relative to training targets for the positive and negative samples;

after training the first machine learning model, compute, for each client in the collection of clients, for each of certain research topics covered by the research organization, a client-interest score, based on the client engagement data for the client, wherein the client-interest scores are computed using the first machine learning model, and wherein the client-interest scores are numerical values in the continuous range of non-binary values;

after training the second machine learning model, compute embeddings for each of the clients and embeddings for each of the certain research topics, wherein the embeddings are computed using the second machine learning model, such that embeddings for clients with similar interests are within a first threshold distance, according to a distance metric, in a client embedding space, and such that embeddings for certain research topics with similar client engagements are within a second threshold distance, according to the distance metric, in a research topic embedding space;

perform hard matching of the clients to the certain research topics based on the client-interest scores from the random forest model, wherein the hard matching identifies clients with an interest in the certain research topics above a threshold value;

perform soft matching of the clients to the certain research topics based on the embeddings from the ANN, wherein the soft matching identifies additional clients for distribution of a research work product item based on whether the embeddings for the clients are sufficiently close to the embeddings for one or more clients that are predicted to have an interest in the research work product item from the hard matching; and determine a distribution list for a particular research work product item, wherein the distribution list comprises a list of clients determined from results from both the hard matching and soft matching.

2. The computer system of claim 1, wherein:

the positive and negative training samples are randomly generated; and the embeddings comprise M-dimensional vectors, wherein M is greater than 10.

3. The computer system of claim 1, wherein the computer memory further stores instructions that when executed by the one or more processors, causes the one or more processors to compute the client engagement scores by, for each client, for each of the certain research topics:

compute a plurality of normalized interest signal scores based on the client engagement data;

rank the plurality of normalized interest signal scores in descending order, to thereby generated a ranked order of normalized interest signal scores for the client for the certain research topic; and compute the client engagement score for the client for the certain research topic based on a weighted average of the plurality of normalized interest signal scores for the client for the certain research topic, such that a higher ranked normalized interest signal score is weighted greater than a lower ranked normalized interest signal score.

4. The computer system of claim 3, wherein the ranked order of normalized interest signal scores are weighted according to an exponential decay weighting function.

5. The computer system of claim 1, wherein:

the research organization comprises a financial securities research organization that produces research work product pertaining to tickers, industries, and investment asset classes, such that the certain research topics comprise the tickers, the industries, and the investment asset classes;

each of the clients is related to one or more investment funds;

the database system further stores data indicative of trades and holdings of the one or more investment funds; and the first machine learning model trained using the trades and holdings of the one or more investment funds as features for the decision trees.

6. The computer system of claim 3, wherein:

the positive and negative training samples are randomly generated; and the embeddings comprise M-dimensional vectors, wherein M is greater than 10.

7. The computer system of claim 5, wherein the computer memory further stores instructions that when executed by the one or more processors, causes the one or more processors to compute the client engagement scores by, for each client, for each of the certain research topics:

compute a plurality of normalized interest signal scores based on the client engagement data;

rank the plurality of normalized interest signal scores in descending order, to thereby generated a ranked order of normalized interest signal scores for the client for the certain research topic; and compute the client engagement score for the client for the certain research topic based on a weighted average of the plurality of normalized interest signal scores for the client for the certain research topic, wherein the ranked order of normalized interest signal scores are weighted according to an exponential decay weighting function, such that a higher ranked normalized interest signal score is weighted greater than a lower ranked normalized interest signal score.

8. The computer system of claim 7, wherein the plurality of normalized interest signal scores comprise at least a read concentration interest signal score, for a client for a research topic, indicative of a concentration of research work product items produced by the research organization accessed by the client pertaining to the topic from the web portal of the research organization relative to all work product items produced by the research organization accessed by the client from the web portal.

9. The computer system of claim 8, wherein the plurality of normalized interest signal scores additionally comprise two or more of the following interest signal scores:

a readership interest signal score, for a client for a research topic, indicative of research work product items produced by the research organization accessed by the client pertaining to the topic from the web portal of the research organization;

an interaction interest signal score, for a client for a research topic, indicative of communication interactions by the client with one or more analysts of the research organization pertaining to the topic;

a web portal time interest signal score, for a client for a research topic, indicative of time spent, by the client, on web pages of the web portal of the research organization pertaining to the topic;

a subscription interest signal score, for a client for a research topic, indicative of subscriptions of the client for research work product of the research organization;

a corporate meetings interest signal score, for a client for a research topic, indicative of attendance by the client at a corporate meeting pertaining to the topic;

a model downloads interest signal score, for a client for a research topic, indicative of a number of models downloaded by the client from the web portal of the research organization pertaining to the topic; and an email opens interest signal score, for a client for a research topic, indicative of a number of emails, pertaining to the topic, from the research organization to the client, opened by the client.

10. The computer system of claim 1, wherein:

the computer system further comprises one or more email servers for emailing, to the clients on the distribution list, a link on a web portal of the research organization to the particular research work product item.

11. A method comprising:

storing, in a database system, client engagement data for clients of a research organization, wherein the client engagement data comprise data indicative of engagement by a collection of clients with the research organization, wherein the data indicative of engagement comprise:

data indicative of downloads by clients of research work product from a web portal of the research organization; and data indicative of communication interactions between the client and personnel of the research organization;

computing, by a computer system that is in communication with the database system and that comprises one or more processors, for each client in the collection of clients, for each of certain research topics, a client engagement score based on the client engagement data for the client;

training, by the computer system, via machine learning, a first machine learning model to compute a client-interest score for each client for each of the certain research topics, such that the client-interest score for each client for each research topic is a numerical value in a continuous range of non-binary values indicative of interest of the client in the research topic, wherein the first machine learning model comprises a random forest with a plurality of decision trees, and wherein the client engagement scores are used as training data labels for training the random forest;

training, by the computer system, via machine learning, a second machine learning model to compute multi-dimensional embeddings for clients and multi-dimensional embeddings for research topics, wherein the second machine learning model is trained to compute the embeddings with both positive and negative training samples from the client-interest scores, wherein the second machine learning model comprises a deep artificial neural network ("ANN"), wherein the ANN comprises a dot product layer and a drop-out layer, and utilizing a ReLU activation function, wherein the ANN is trained to calculate a similarity of each client in the collection of clients to each research topic, and wherein the embeddings comprise updated weights for connections of the ANN through training of the ANN to minimize errors of outputs of the ANN relative to training targets for the positive and negative samples;

after training the first machine learning model, computing, by the computer system, for each of the certain research topics, a client-interest score, based on the client engagement data for the client, wherein computing the client-interest scores comprises computing the client-interest scores with the first machine learning model, and wherein the client-interest scores are numerical values in the continuous range of non-binary values; and after training the second machine learning model, computing, by the computer system, embeddings for each of the clients and embeddings for each of the certain research topics, wherein the embeddings are computed using the second machine learning model, such that embeddings for clients with similar interests are within a first threshold distance, according to a distance metric, in a client embedding space, and such that embeddings for certain research topics with similar client engagements are within a second threshold distance, according to the distance metric, in a research topic embedding space;

performing hard matching of the clients to the certain research topics based on the client-interest scores from the random forest model, wherein the hard matching identifies clients with an interest in the certain research topics above a threshold value;

performing soft matching of the clients to the certain research topics based on the embeddings from the ANN, wherein the soft matching identifies additional clients for distribution of a research work product item based on whether the embeddings for the clients are sufficiently close to the embeddings for one or more clients that are predicted to have an interest in the research work product item from the hard matching; and determining a distribution list for a particular research work product item, wherein the distribution list comprises a list of clients determined from results from both the hard matching and soft matching.

12. The method of claim 11, wherein:
the positive and negative training samples are randomly generated; and
the embeddings comprise M-dimensional vectors, wherein M is greater than 10.

13. The method of claim 12, wherein computing the client engagement scores comprises, for each client, for each of the certain research topics:
    computing, by the computer system, a plurality of normalized interest signal scores based on the client engagement data;
    ranking, by the computers system, the plurality of normalized interest signal scores in descending order, to thereby generated a ranked order of normalized interest signal scores for the client for the certain research topic; and
    computing, by the computer system, the client engagement score for the client for the certain research topic based on a weighted average of the plurality of normalized interest signal scores for the client for the certain research topic, wherein the ranked order of normalized interest signal scores are weighted according to an exponential decay weighting function, such that a higher ranked normalized interest signal score is weighted greater than a lower ranked normalized interest signal score.

14. The method of claim 13, wherein the plurality of normalized interest signal scores comprise at least a read concentration interest signal score, for a client for a research topic, indicative of a concentration of research work product items produced by the research organization accessed by the client pertaining to the topic from a web portal of the research organization relative to all work product items produced by the research organization accessed by the client from the web portal.

15. The method of claim 14, wherein the plurality of normalized interest signal scores additionally comprise two or more of the following interest signal scores:
    a readership interest signal score, for a client for a research topic, indicative of research work product items produced by the research organization accessed by the client pertaining to the topic from the web portal of the research organization;
    an interaction interest signal score, for a client for a research topic, indicative of communication interactions by the client with one or more analysts of the research organization pertaining to the topic;
    a web portal time interest signal score, for a client for a research topic, indicative of time spent, by the client, on web pages of the web portal of the research organization pertaining to the topic;
    a subscription interest signal score, for a client for a research topic, indicative of subscriptions of the client for research work product of the research organization;
    a corporate meetings interest signal score, for a client for a research topic, indicative of attendance by the client at a corporate meeting pertaining to the topic;
    a model downloads interest signal score, for a client for a research topic, indicative of a number of models downloaded by the client from the web portal of the research organization pertaining to the topic; and
    an email opens interest signal score, for a client for a research topic, indicative of a number of emails, pertaining to the topic, from the research organization to the client, opened by the client.

16. The method of claim 12, wherein:
the research organization comprises a financial securities research organization that produces research work product pertaining to tickers, industries, and investment asset classes, such that the certain research topics comprise the tickers, the industries, and the investment asset classes;
each of the clients is related to one or more investment funds;
the method further comprises storing, by the database system, data indicative of trades and holdings of the one or more investment funds; and
training the first machine learning model comprises using the trades and holdings of the one or more investment funds as features for the decision trees.

17. The method of claim 11, wherein:
the research organization comprises a financial securities research organization that produces research work product pertaining to tickers, industries, and investment asset classes, such that the certain research topics comprise the tickers, the industries, and the investment asset classes;
each of the clients is related to one or more investment funds; and
the method further comprises:
    storing, by the database system, data indicative of trades and holdings of the one or more investment funds; and
    training the first machine learning model using the trades and holdings of the one or more investment funds as feature for the decision trees.

18. The method of claim 17, further comprising:
emailing, by one or more email servers that are in communication with the computer system, to the clients on the distribution list, a link on a web portal of the research organization to the particular research work product item.

19. The method of claim 11, further comprising:
emailing, by one or more email servers that are in communication with the computer system, to the clients on the distribution list, a link on a web portal of the research organization to the particular research work product item.

20. A computer system for a research organization, the computer system comprising:
a database system for storing client engagement data for clients of the research organization, wherein the client engagement data comprise data indicative of engagement by a collection of clients with the research organization, wherein the data indicative of engagement comprise:
    data indicative of downloads by clients of research work product from a web portal of the research organization; and
    data indicative of communication interactions between the client and personnel of the research organization;

means for computing a client engagement score, for each of certain research topics of the organization, based on the client engagement data for the client;

means for training, via machine learning, a first machine learning model to compute a client-interest score for each client, for each of the certain research topics, such that the client-interest score for each client for each research topic is a numerical value in a continuous range of non-binary values indicative of interest of the client in the research topic, wherein the first machine learning model comprises a random forest with a plurality of decision trees, and wherein the client engagement scores are used as training data labels for training the random forest;

means for training, via machine learning, a second machine learning model to compute multi-dimensional embeddings for clients and multi-dimensional embeddings for research topics, wherein the second machine learning model is trained to compute the embeddings with both positive and negative training samples from the client-interest scores, wherein the second machine learning model comprises a deep artificial neural network ("ANN"), wherein the ANN comprises a dot product layer and a drop-out layer, and utilizing a ReLU activation function, wherein the ANN is trained to calculate a similarity of each client in the collection of clients to each research topic, and wherein the embeddings comprise updated weights for connections of the ANN through training of the ANN to minimize errors of outputs of the ANN relative to training targets for the positive and negative samples;

means for computing, for each client in the collection of clients, for each of the certain research topics covered by the research organization, a client-interest score, based on the client engagement data for the client, wherein the client-interest scores are computed using the first machine learning model, and wherein the client-interest scores are numerical values in the continuous range of non-binary values; and means for computing embeddings for each of the clients and embeddings for each of the certain research topics, wherein the embeddings are computed using the second machine learning model, such that embeddings for clients with similar interests are within a first threshold distance, according to a distance metric, in a client embedding space, and such that embeddings for certain research topics with similar client engagements are within a second threshold distance, according to the distance metric, in a research topic embedding space;

means for hard matching of the clients to the certain research topics based on the client-interest scores from the random forest model, wherein the hard matching identifies clients with an interest in the certain research topics above a threshold value;

means for soft matching of the clients to the certain research topics based on the embeddings from the ANN, wherein the soft matching identifies additional clients for distribution of a research work product item based on whether the embeddings for the clients are sufficiently close to the embeddings for one or more clients that are predicted to have an interest in the research work product item from the hard matching; and means for determining a distribution list for a particular research work product item, wherein the distribution list comprises a list of clients determined from results from both the hard matching and soft matching.

21. The computer system of claim 20, wherein the means for computing the embeddings comprises an artificial neural network (ANN), wherein:

the positive and negative training samples are randomly generated; and the embeddings comprise M-dimensional vectors, wherein M is greater than 10.

\* \* \* \* \*